UNITED STATES PATENT OFFICE.

CHARLES M. SPOONER, OF NEW BEDFORD, MASSACHUSETTS.

IMPROVED COMPOSITION FOR COATING SHIPS' BOTTOMS.

Specification forming part of Letters Patent No. 49,567, dated August 22, 1865.

*To all whom it may concern:*

Be it known that I, CHARLES M. SPOONER, of New Bedford, in the county of Plymouth and State of Massachusetts, have invented a new and useful composition to be applied to the bottom of a navigable vessel, or the surface of any other body, to protect the same, when immersed in sea-water, from becoming fouled by either animal or vegetable matters; and I do hereby declare the said composition and the mode of compounding it to be as follows:

The elements or constituents of the said composition, with their proportions, may be thus stated: five hundred pounds of candle-pitch, common resinous pitch, or bitumen; forty gallons of arsenious acid; one hundred pounds of carbonate of potassa or other suitable alkaline carbonate; twenty pounds of sulphur; one hundred and twenty gallons of either petroleum, naphtha, or terebinthine oil.

The process which may be adopted for compounding such ingredients may be explained as follows: First, melt the candle-pitch in a kettle and heat it to a temperature of about 350° Fahrenheit, after which throw into it the sulphur, which melt with the pitch. Next, and while the mixture is in a liquid state and has become cooled down to a temperature which will enable it to receive the naphtha without creating any material evaporation thereof, add to the mixture one-half the quantity of the naphtha. Next combine the arsenious acid and the carbonate of potassa by boiling the two with a sufficient quantity of water—that is, about forty gallons—and keep up the boiling for about five hours. Next, and after it may have become cooled down to or about to atmospheric temperature, the solution of arsenious acid and carbonate of potassa should be mixed with the pitch, sulphur, and naphtha as previously combined, after which the balance of the naphtha should be mixed with the whole. The composition will then be ready for use, and in applying it to a surface it is to be spread thereon with a brush.

The purpose of the alkaline carbonate is to dissolve the arsenious acid, which is destructive to marine plants and animals. The sulphur imparts drying qualities to the mixture and is advantageous in other respects. The naphtha not only liquefies and thins the mixture, but after the latter may have been spread on a surface will more or less evaporate from and leave it in a hardened state.

My invention is not to be confined to the precise proportions of its ingredients as hereinbefore explained, as such proportions may be somewhat varied and still be productive of good results.

The composition so made has been applied to vessels with great success, or has proved to be an excellent protection to them against the accumulation thereon of marine shells, animals, or plants. Furthermore, my composition when applied to the bottom of a ship presents a very smooth surface, like that of enamel or glass, such serving to facilitate the sailing qualities of the vessel.

I claim as my invention—

The said composition, made of the ingredients and in the manner substantially as described.

CHAS. M. SPOONER.

Witnesses:
R. H. EDDY,
F. P. HALE, Jr.